(12) United States Patent
Lee

(10) Patent No.: US 6,760,662 B2
(45) Date of Patent: Jul. 6, 2004

(54) ROUTE GUIDING METHOD FOR IN-VEHICLE NAVIGATION DEVICE

(75) Inventor: Eun-Hee Lee, Kwangmyong-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/135,037

(22) Filed: Apr. 29, 2002

(65) Prior Publication Data

US 2002/0165667 A1 Nov. 7, 2002

(30) Foreign Application Priority Data

May 3, 2001 (KR) .................................... 2001/0024166
Mar. 18, 2002 (KR) .................................... 2002/0014428

(51) Int. Cl.⁷ ...................... G01C 21/34; G08G 1/0969
(52) U.S. Cl. .................. 701/211; 701/205; 340/995.21
(58) Field of Search ................ 701/211, 205, 701/210; 340/995.12, 995.2, 995.21, 995.22

(56) References Cited

U.S. PATENT DOCUMENTS

| | | | | |
|---|---|---|---|---|
| 5,523,765 A | * | 6/1996 | Ichikawa | .................... 342/451 |
| 5,793,631 A | * | 8/1998 | Ito et al. | .................... 701/211 |
| 5,875,412 A | * | 2/1999 | Sulich et al. | ............... 701/207 |
| 5,938,718 A | * | 8/1999 | Morimoto et al. | .......... 701/201 |
| 6,104,315 A | * | 8/2000 | Volkel et al. | ............... 340/988 |
| 6,256,580 B1 | * | 7/2001 | Meis et al. | .................. 701/202 |
| 6,292,743 B1 | * | 9/2001 | Pu et al. | ..................... 701/202 |
| 6,453,235 B1 | * | 9/2002 | Endo et al. | ................. 701/211 |

OTHER PUBLICATIONS

Korean Patent Application No. 45851 entitled *"Navigation System Using Wireless Communication Network and Route Guidance Method Thereof"*,, filed Jul. 30, 2001. (A Certified Translation of this Korean Patent Application is also included.).

* cited by examiner

Primary Examiner—Michael J. Zanelli
(74) Attorney, Agent, or Firm—Dilworth & Barrese LLP

(57) ABSTRACT

A route guiding method for an in-vehicle navigation device. To guide a vehicle to a destination by an optimum route, it is determined whether the vehicle is on track within a predetermined intersection range based on route guidance data received from a traffic information center via a mobile communication network. If the vehicle is on track within the intersection range, it is determined whether the vehicle is in a free run state according to predetermined free run conditions to prevent a preliminary route guidance message that is confusing to a driver in the free run state. According to the determination result, the preliminary route guidance message is selectively provided.

11 Claims, 3 Drawing Sheets

ROUTE GUIDING METHOD FOR IN-VEHICLE NAVIGATION DEVICE

PRIORITY

This application claims priority to an application entitled "Route Guiding Method for In-Vehicle Navigation Device" filed in the Korean Industrial Property Office on May 3, 2001 and assigned Serial No. 2001-24166, and to an application entitled "Route Guiding Method for In-Vehicle Navigation Device" filed in the Korean Industrial Property Office on Mar. 18, 2002 and assigned Serial No. 2002-14428, the contents of both of which are hereby incorporated by reference.

BACKGROUND OF THE INVENTION

1. Field of the Invention

The present invention relates generally to a navigation device, and in particular, to a route guiding method for an in-vehicle navigation device.

2. Description of the Related Art

Navigation using satellite signals was first used for aircrafts and nautical vessels, and is now becoming more widespread in other vehicles, such as cars, trucks, busses, motorcycles, etc. As vehicles are being equipped with in-vehicle navigation devices using satellites, many techniques are being developed to track the vehicles more precisely. Such an in-vehicle navigation device receives data about the position of a vehicle from the satellites, reads map data from a device in the vehicle, and pinpoints the shortest route on the map visibly and audibly for a user. The route guidance function is fundamental to the in-vehicle navigation device. After an optimum route to a destination is calculated, when a vehicle is traveling and an intersection is in sight, information about the intersection is provided to the user. The guidance information about the intersection is provided to the user by voice and with a related image when the vehicle reaches a specified point (e.g., 100 or 300 m ahead), alerting the user of the direction he is supposed to turn at the intersection beforehand.

The conventional in-vehicle navigation device, however, confuses the user by providing guidance information about a next intersection during turning at an intersection or providing scheduled intersection information to the user when the user's vehicle is off track.

SUMMARY OF THE INVENTION

It is, therefore, an object of the present invention to provide an improved route guiding method for an in-vehicle navigation device.

It is another object of the present invention to provide a route guiding method that eliminates the confusing situation where guidance information about the next intersection is provided during successive intersections or when a vehicle is off track.

The foregoing and other objects are achieved by providing a route guiding method for an in-vehicle navigation device. To guide a vehicle to a destination by an optimum route, it is determined whether the vehicle is on track within a predetermined intersection range based on route guidance data received from a traffic information center via a mobile communication network. If the vehicle is on track within the intersection range, it is determined whether the vehicle is in a free run state according to predetermined free run conditions preventing a preliminary route guidance message that is confusing to a driver in the free run state. According to the determination result, the preliminary route guidance message is selectively provided.

The free run conditions include coincidence between the direction the vehicle is pointing and the direction of a calculated route, the azimuth difference between a road that the vehicle takes and the other roads at an intersection, the distance the vehicle moves from the intersection, and the distance between the current intersection and a next intersection.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

An in-vehicle navigation device according to the present invention will be described in the context of in-vehicle navigation using a portable terminal. However, it should be appreciated that an in-vehicle navigation device may be implemented using any wireless communication device.

An example of an in-vehicle navigation device using a portable terminal is Korean Patent Application No. 2001-45851 entitled "Navigation System Using Wireless Communication Network And Route Guidance Method Thereof". The disclosed navigation system includes a portable terminal and a traffic information center, which will be described with reference to FIG. 1.

Figure 1:
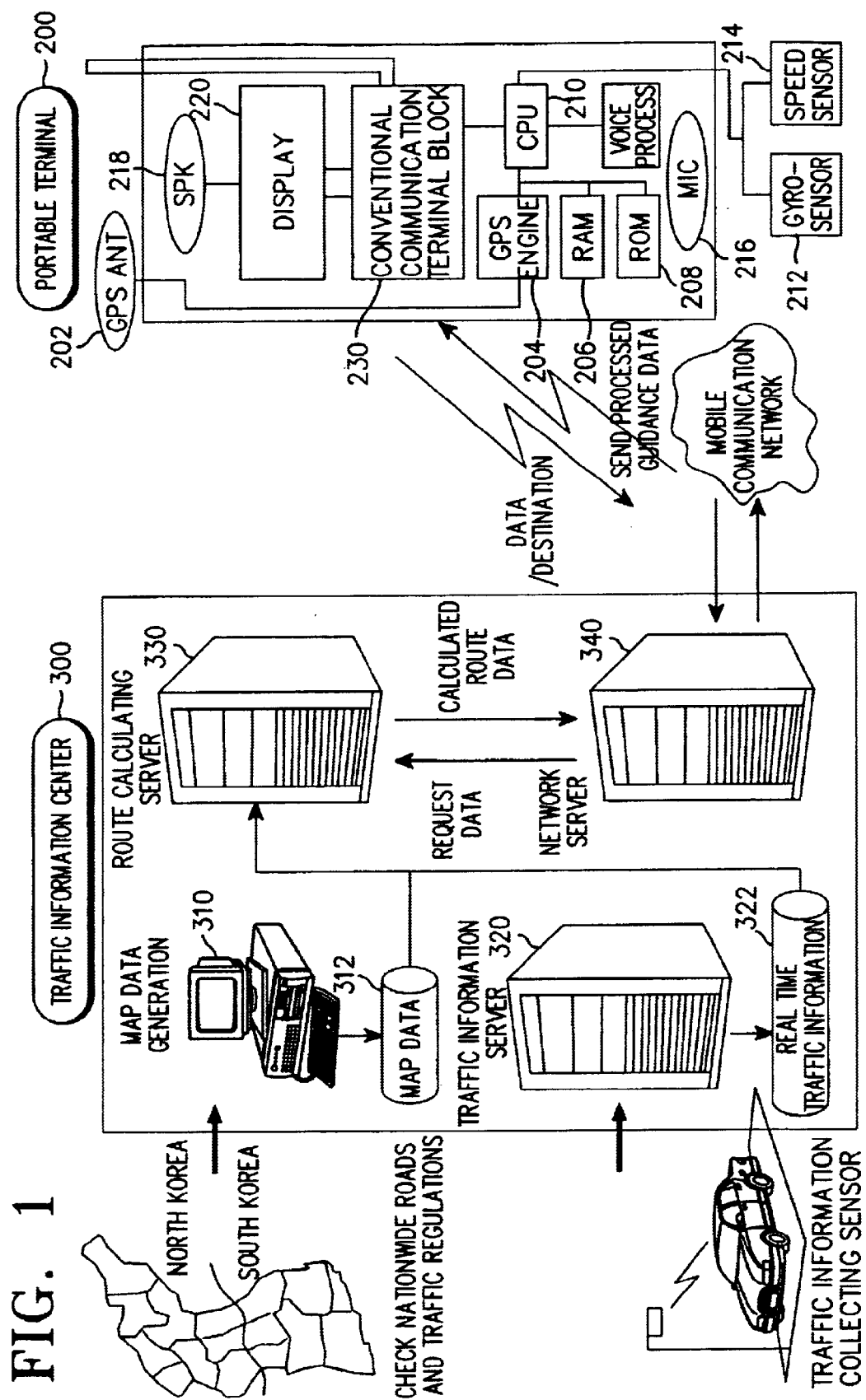
FIG. 1 illustrates a navigation system configuration to which the present invention is applied.

In FIG. 1, the navigation system includes a portable terminal 200, a mobile communication network, and a traffic information center 300. The traffic information center 300 is comprised of a computer 310, a traffic information server 320, a route calculating server 330, a network server 340, a map data storage 312, and a real time traffic information storage 322. The computer 310 generates map data according to preliminarily checked road and traffic conditions (e.g., nationwide road network and traffic regulations). The map data is stored in the map data storage 312. The traffic information server 320 receives traffic information from multiple traffic information collecting sensors and stores it as real time traffic information in the real time traffic information storage 322. The route calculating server 330 calculates an optimum route between the current position of the vehicle to its destination based on the map data and the real time traffic information and generates route guidance data about the calculated optimum route. The network server 340 connects the traffic information center 300 to the mobile communication network.

The mobile communication network sends information about the current position and destination of the vehicle received from the portable terminal 200 to the traffic information center 300. After receiving a download request from the portable terminal 200, the mobile communication network sends optimum route guidance data received from the traffic information center 300 to the portable terminal 200. This mobile communication network is wirelessly connected to the portable terminal 200 for a wireless connection service, and can be built with an existing digital cellular system or PCS system. Alternatively, a currently developed IMT-2000 system can be used as the mobile communication network.

The portable terminal 200 includes a GPS (Global Positioning System) antenna 202, a GPS engine 204, a RAM (Random Access Memory) 206, a ROM (Read Only Memory) 208, a CPU (Central Processing Unit) 210, a voice processor 211, a gyro-sensor 212, a speed sensor 214, a microphone (MIC) 216, a speaker 218, a display 220, and a conventional communication terminal block 230. The components, other than the navigation-related function blocks including the GPS antenna 202, the GPS engine 204, the gyro-sensor 212, and the speed sensor 214, are from a conventional portable terminal.

Yet, the RAM 206 stores data downloaded from the traffic information center 300 and the ROM 208 stores intersection image data. The voice processor 211 has a voice IC (Integrated Circuit) and store voice data from which route information is provided audibly. The display 220 (e.g., an LCD (Liquid Crystal Display)) displays optimum route information graphically. The optimum route information is output audibly through the speaker 218.

The portable terminal 200 downloads route guidance data from the traffic information center 300 via the mobile communication network and guides the user to the destination in an optimum route based on the route guidance data. The optimum route is presented to the user visibly through the display 220 or audibly through the speaker 218, or both. The optimum route is represented by intersection information containing intersection names and turning directions at the intersections.

In accordance with an embodiment of the present invention, to provide improved route guidance in an in-vehicle navigation device, if a vehicle is within a preset intersection range despite on track, it is determined whether the vehicle is placed in a free run state according to preset conditions. A preliminary route guidance message is selectively provided to the driver of the vehicle according to the determination result to thereby prevent confusion caused by providing an inappropriate preliminary route guidance message. The free run state is defined as a deviation of the vehicle from a calculated optimum route although the portable terminal determines that the vehicle is on track. In the free run state, no preliminary route guidance messages that may cause confusion to the driver are provided to the driver. To determine the free run state, it is checked whether the vehicle is on track and whether it is within a preset intersection range. The latter is not a mandatory condition. That is, if the vehicle is on track, the determination as to whether it is placed in the free run state can be made directly. In this case, system load is increased but improved system performance may suppress the load increase.

Figure 2:
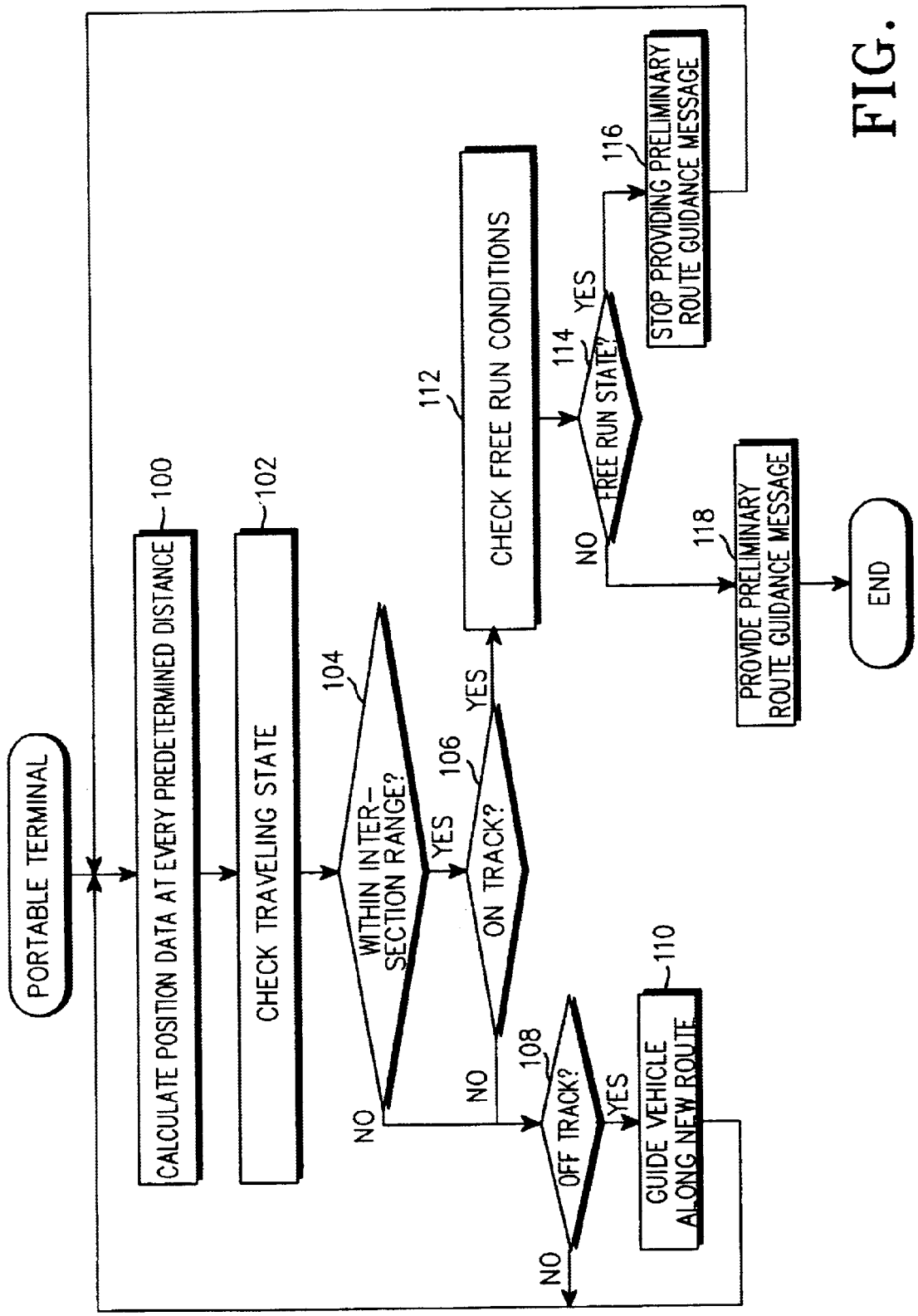
FIG. 2 is a flowchart illustrating a route guidance control operation according to an embodiment of the present invention.
Figure 3:
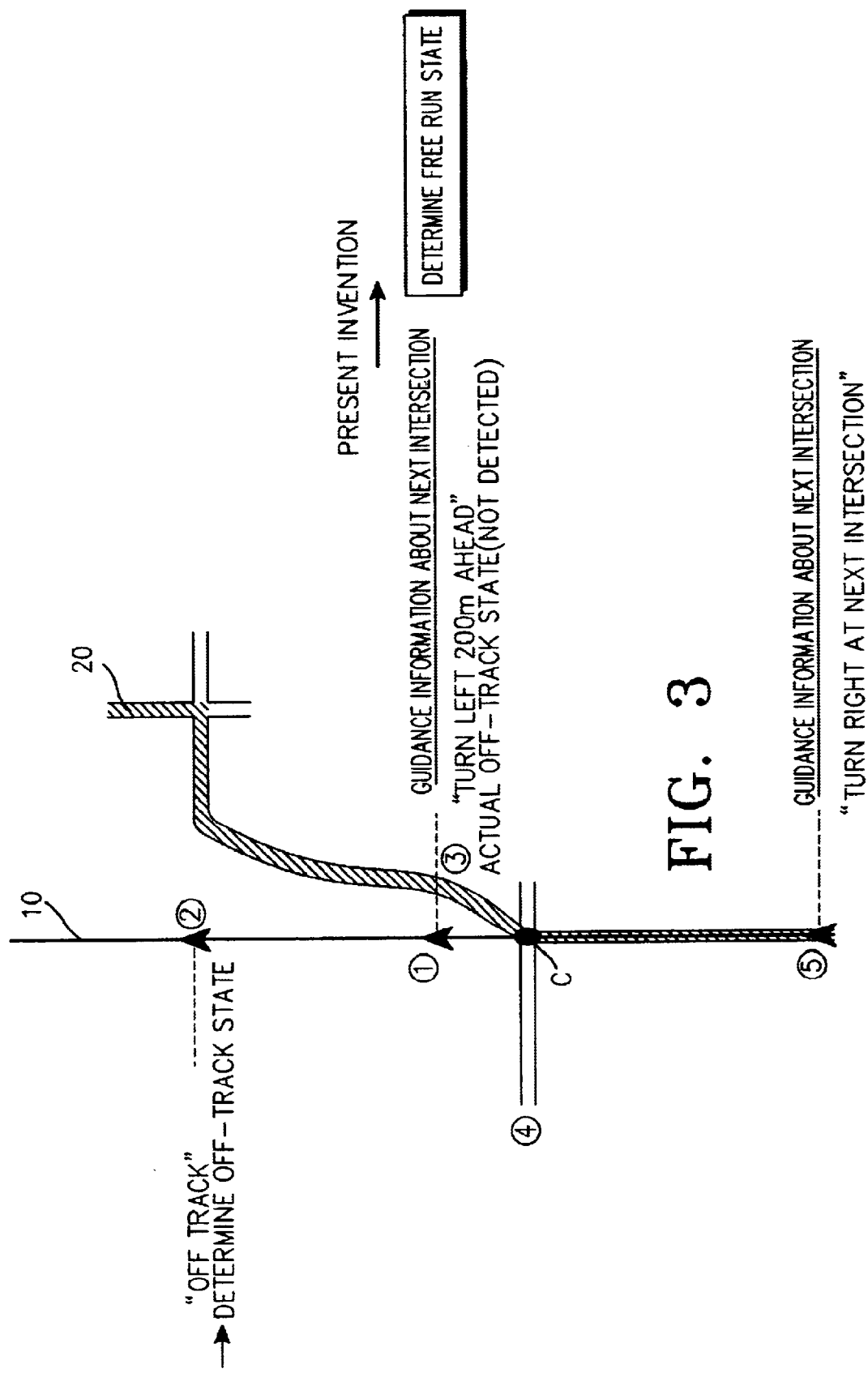
FIG. 3 illustrates a method of determining a free run state according to the embodiment of the present invention.

FIG. 2 is a flowchart illustrating a route guidance control operation and FIG. 3 depicts a free run state determining operation according to the embodiment of the present invention. Referring to FIGS. 1, 2 and 3, the traffic information center 300 determines a current road based on data of a present vehicle position and a destination received from the portable terminal 200 mounted in the vehicle, calculates an optimum route, and sends processed guidance data (i.e., route information) to the portable terminal 200 via the mobile communication network. According to the present invention, the traffic information center 300 has at least linear information and intersection information including direction information about nearby roads from the current vehicle position and the destination in order to determine the free run state.

The portable terminal 200 provides a preliminary route guidance message to the driver based on the received processed guidance data and determines whether the vehicle is on track using the gyro-sensor 212, the speed sensor 214, and the GPS antenna 202. If the vehicle is off track, the portable terminal 200 searches again for an optimum route from the current position of the vehicle and the destination.

Referring to roads illustrated in FIG. 3, reference numeral 20 denotes a preset route calculated by the traffic information center as an optimum route between the current vehicle position and the destination. Reference numeral 10 denotes a route in which the vehicle is actually traveling (hereinafter, referred to as an actual traveling route) after it is off the optimum route. The vehicle actually travels in the direction indicated by arrows in FIG. 3.

While the vehicle is supposed to move from an intersection C toward a node point P3, it may take a wrong turn and head down to a node point P1 on a route 10. Then, the portable terminal 200 determines that the vehicle is still on track because it finds no major difference in bearing and position between the node point P1 and the node point P3 using the gyro-sensor 212, the speed sensor 214, and the GPS antenna 202. In other words, the portable terminal 200 cannot determine accurately whether the vehicle is at the node point P1 or at the node point P3. In this case, the portable terminal 200 determines that the vehicle is on track and provides a corresponding preliminary route guidance message, i.e. wrong route information to the driver. For example, after a preliminary guidance message "turn right at the next intersection" is issued, the vehicle misses the turn and proceeds to the node point P1 at the intersection C and then receives a wrong preliminary guidance message "turn left 200 m ahead" visibly and audibly, which is suitable at the node point P3. Consequently, the driver is confused by the wrong message.

In the embodiment of the present invention, in order not to confuse the driver in the above situation, even if it is determined that the vehicle is on track within a preset intersection range, it is determined whether the vehicle satisfies preset free run conditions which will be described later in detail. If the vehicle meets the free run conditions, it is determined that the vehicle is actually off track and the preliminary guidance message related to the next node point is not provided to the driver. That is, the vehicle travels in the free run state. Here, it is preferable to check whether sensors malfunction or not before the free run state is determined. Then, the portable terminal 200 determines accurately that the vehicle is distinctively off track when it passes the node point P1 and reaches a node point P2. The portable terminal 200 is connected to the traffic information center 300 again, receives new optimum route information, and guides the vehicle to a new optimum route. If the vehicle takes an apparently wrong turn and heads down to a node point P4, the portable terminal 200 determines that the vehicle is obviously off track, without entering the free run state.

In conjunction with the roads illustrated in FIG. 3, the free run state determining operation according to the embodiment of the present invention will be described with reference to FIG. 2. Referring to FIG. 2, the portable terminal 200 calculates the position of the vehicle each time the vehicle travels a predetermined distance in step 100 and determines the route traveling state of the vehicle based on the vehicle position data and route information received from the traffic information center 300 in step 102. In step 104, the portable terminal 200 determines whether the vehicle is within a preset intersection range using intersection information received from the traffic information center 300. The intersection range is set differently depending on road types. For example, the intersection range is set to an area with a radius of 500 m with respect to an intersection, preferably in a highway. In a normal road, it is preferable to set the intersection range to an area with a radius of 300 m with respect to an intersection. It is obvious that the intersection range is not limited to the above-specified distances but can be set freely depending on road conditions in corresponding countries. Thus, it is preferable to set the intersection range to 300 m to 500 m. In FIG. 3, the intersection range is an area with a radius of 300 m or 500 m with respect to the intersection C. As stated before, it is not mandatory to determine whether the vehicle is within the intersection range while it may reduce system load in the present invention. In other words, step 104 can be omitted in FIG. 2. If the vehicle is within the intersection range in step 104, then it is determined whether the vehicle is on track in step 106. If the vehicle is on track in step 106, the free run conditions are checked in step 112 and it is directly determined whether the vehicle is in the free run state in step 114. In this case, system load is increased, which can be overcome by improved system performance.

If the vehicle is not within the intersection range in step 104, the portable terminal 200 determines whether the vehicle is off track in step 108. For example, if the vehicle is at the node point P2 beyond the intersection range in a route apparently different from the calculated optimum route 20 in FIG. 3, the portable terminal 200 determines that the vehicle is off track. The off-track determination is made after N times-check. If the vehicle is off track in step 108, the portable terminal 200 is reconnected to the traffic information center 300, downloads new route information from the traffic information center 300, and guides the driver along a new route in step 110. If the vehicle is on track in step 108, then the portable terminal provides the driver with the preliminary route guidance message in step 118.

On the other hand, if the vehicle is within the intersection range in step 104, the portable terminal 200 determines whether the vehicle is on track or off track based on information received from the gyro-sensor 212, the speed sensor 214, and the GPS antenna 202 and route guidance data received from the traffic information center 300 in step 106. For example, if the vehicle is at the node point P4 within the intersection range in a route apparently different from the calculated optimum route 20, the portable terminal 200 determines that the vehicle is not on track in step 106. The off track determination is made after N times-check. If the vehicle is off track in step 106, the portable terminal 200 is reconnected to the traffic information center 300, downloads new route information from the traffic information center 300, and guides the driver along a new route in step 110.

As stated above, if the vehicle is on track within the intersection range in step 106, the portable terminal 200 goes to step 112 in order to accurately determine whether the vehicle is actually on track, or the off-track state of the vehicle is not detected, by checking the free run conditions.

In step 114, the portable terminal 200 determines whether the vehicle is in the free run state. According to the embodiment of the present invention, the following conditions are checked to determine the free run state. Among them, conditions (1) and (3) are related to an actual traveling route and a calculated route, and conditions (2) and (4) are related to intersection shape and intersection topography.

(1) Whether the direction the vehicle is pointing is identical to the direction of the calculated route;
(2) The difference between the azimuth of a road that the vehicle takes at an intersection and the azimuths of the other roads;
(3) The distance the vehicle has covered from the intersection; and
(4) The distance between the current intersection and the next intersection.

As stated above, in step 114, the portable terminal 200 determines whether the vehicle is in the free run state according to the above conditions. In the free run state, the portable terminal 200 temporarily stops providing a confusing preliminary guidance message to the driver in step 116. For example, it is determined whether the vehicle is in the free run state if it is at the node point P1 or P3 in FIG. 3. At the node point P1, the vehicle satisfies the free run conditions, whereas at the node point P3, it does not satisfy the free run conditions.

The free run state is maintained until the vehicle moves to a node point that does not satisfy the free run conditions in the route 10 in FIG. 3. In the free run state, no preliminary guidance messages are provided to the driver to avoid preliminary guidance message-causing confusion.

The free run conditions will be described in more detail herein below.

Conditions (1) and (2) are checked using the linear information and intersection information to the destination received from the traffic information center (300).

Condition (1): the gyro-sensor 212 of the portable terminal 200 determines whether the vehicle is pointing in the direction of the calculated route 20. Condition (1) is satisfied when the heading of the vehicle is different from the bearing of the calculated route 20. If the heading of the vehicle is beyond 30° with the bearing of the route 20, the portable terminal 200 cannot normally determine whether the vehicle is on track or off track. Therefore, the angle is between 10° and 30° preferably in the free run state.

Condition (2): the checked items are the azimuth difference between the road in which the vehicle is moving off track and the calculated route, and the azimuth difference between the road in which the vehicle is moving off track and the nearest road to the calculated route. This condition is satisfied when both azimuth differences are 30° or below.

Condition (3): the distance the vehicle has moved from the intersection is different depending on road type. Condition (3) is satisfied if the vehicle has moved 20 to 30 m from the intersection in the case of a highway and if the vehicle has moved 5 to 10 m from the intersection in the case of a normal road.

Condition (4): the distance between the current intersection and the next intersection is 300 m or less, preferably 100 m or less. This is also different depending on road type. The distance between intersections is usually long in a highway. Since a preliminary guidance message is not likely to be issued shortly after the vehicle takes a turn at an intersection in a highway, the free run state may be lengthened, as compared to a normal road. Therefore, the distance between the current intersection and the next intersection is preferably 100 m or less for a normal road, and it is preferably 100 to 300 m in a highway.

Only if all the above conditions are satisfied, the portable terminal 200 determines that the vehicle is in the free run state. For example, if the direction the vehicle is pointing is different from the direction of the calculated route by about 20° or higher, the azimuth of the actual traveling road is different from those of the other roads at an intersection by 30° or lower, the vehicle has moved 7 m or farther from the intersection in a normal road, and the current intersection is far from the next intersection by 100 m or less, it is determined that the vehicle is in the free run state.

As long as the conditions (1) to (4) are satisfied, the free run state is maintained.

If the four conditions are not satisfied, the portable terminal 200 determines that the vehicle is not in the free run state in step 114 and provides specified route guidance to the driver in step 118, as these instructions will not confuse the driver.

In accordance with the present invention as described above, in order to provide improved in-vehicle navigation, it is determined whether a vehicle is in a free run state according to preset conditions when the vehicle is within a predetermined intersection range. According to the determination result, a preliminary guidance message is selectively provided to a driver. Consequently, wrong guidance message provision-caused confusion is avoided for the driver.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A route guiding method for an in-vehicle navigation device, comprising the steps of:

determining whether a vehicle is on track within a predetermined intersection range based on route guidance data received from a traffic information center via a mobile communication network;

determining whether the vehicle is in a free run state according to predetermined free run conditions to prevent a preliminary route guidance message that is confusing to a driver of the vehicle in the free run state, if the vehicle is on track within the intersection range; and selectively providing the preliminary route guidance message according to whether the vehicle is determined to be in a free run state.

2. The route guiding method of claim 1, wherein the free run conditions include coincidence between a direction the vehicle is pointing and a direction of a calculated route, an azimuth difference between a road that the vehicle takes and other roads at an intersection, a distance the vehicle moves from the intersection, and a distance between the intersection and a next intersection.

3. The route guiding method of claim 2, wherein the azimuth difference between the road that the vehicle takes and the other roads at the intersection is determined by checking the difference between an azimuth of a road that the vehicle takes off track and an azimuth of a road in the calculated route, and the difference between the azimuth of the road that the vehicle takes off track and an azimuth of a nearest road to the road in the calculated route.

4. The route guiding method of claim 1, wherein the predetermined intersection range is an area having a radius of several hundred meters with respect to an intersection.

5. The route guiding method of claim 4, wherein the radius is different on a normal road and on a highway.

6. The route guiding method of claim 5, wherein the radius is 300m on the normal road.

7. The route guiding method of claim 5, wherein the radius is 500 m on the-high-way highway.

8. A route guiding method for an in-vehicle navigation device, comprising the steps of:

determining whether a vehicle is within a predetermined intersection range based on route guidance data received from a traffic information center via a mobile communication system;

determining whether the vehicle is on track based on calculated route information contained in the route guidance data, if the vehicle is within the intersection range;

determining whether the vehicle is in a free run state according to predetermined free run conditions to prevent a preliminary route guidance message that is confusing to a driver of the vehicle in the free run state, if the vehicle is on track in the calculated route;

discontinuing provision of the preliminary route guidance message in the free run state; and providing the preliminary route guidance message before the vehicle reaches a next intersection if the free run conditions are not satisfied.

9. The route guiding method of claim 8, wherein the free run conditions include coincidence between a direction the vehicle is pointing and a direction of a calculated route, an azimuth difference between a road that the vehicle takes and other roads at an intersection, a distance the vehicle moves from the intersection, and a distance between the intersection and a next intersection.

10. A route guiding method for an in-vehicle navigation device, comprising the steps of:

determining whether a vehicle is on track based on route guidance data received from a traffic information center via a mobile communication network;

determining whether the vehicle is in a free run state according to predetermined free run conditions to prevent a preliminary route guidance message that is confusing to a driver of the vehicle in the free run state, if the vehicle is on track; and selectively providing the preliminary route guidance message according to whether the vehicle is determined to be in a free run state.

11. The route guiding method of claim 10, wherein the free run conditions include conditions related with an actual traveling route and a calculated route, and conditions related with intersection shapes and intersection topography.

* * * * *